(12) United States Patent
Bowser

(10) Patent No.: US 6,386,584 B1
(45) Date of Patent: May 14, 2002

(54) AIR BAG FOLD INDICATOR

(75) Inventor: Robert E. Bowser, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/578,293

(22) Filed: May 25, 2000

(51) Int. Cl.⁷ ............................................. B60R 21/16
(52) U.S. Cl. ............................................. 280/743.1
(58) Field of Search ...................... 280/728.1, 743.1, 280/417, 405; 493/12, 16

(56) References Cited

U.S. PATENT DOCUMENTS

| | | | | |
|---|---|---|---|---|
| 4,173,356 A | * | 11/1979 | Ross | 280/728.2 |
| 4,989,525 A | * | 2/1991 | Portilla | 112/10 |
| 5,022,675 A | * | 6/1991 | Zelenak, Jr. et al. | 280/743 |
| 5,162,035 A | * | 11/1992 | Baker | 493/405 |
| 5,163,893 A | * | 11/1992 | Hara et al. | 493/458 |
| 5,222,932 A | * | 6/1993 | Fontecchio | 493/210 |
| 5,275,435 A | * | 1/1994 | Fischer | 280/743 R |
| 5,375,393 A | * | 12/1994 | Baker et al. | 53/429 |
| 5,529,339 A | | 6/1996 | Niederman | 280/743.1 |
| 5,575,748 A | * | 11/1996 | Budde et al. | 493/477 |
| 5,637,641 A | * | 6/1997 | Becker et al. | 525/102 |
| 5,690,358 A | * | 11/1997 | Marotzke | 280/728.1 |
| 5,730,463 A | | 3/1998 | Fisher et al. | 280/743.1 |
| 5,740,221 A | | 4/1998 | Norman et al. | 378/58 |
| 5,755,078 A | | 5/1998 | Hurtig, Jr. et al. | 53/429 |
| 5,865,465 A | | 2/1999 | Bauer et al. | 280/743.1 |
| 5,960,611 A | | 10/1999 | Aigner et al. | 53/429 |
| 6,171,228 B1 | * | 1/2001 | Marotzke et al. | 493/405 |

FOREIGN PATENT DOCUMENTS

| | | | | |
|---|---|---|---|---|
| EP | 670247 A1 | * | 9/1995 | B60R/21/16 |
| EP | 788934 A1 | * | 8/1997 | B60R/21/16 |
| GB | 2242167 A | * | 9/1991 | B60R/21/16 |
| JP | 06179573 A | * | 6/1994 | B65H/45/14 |
| JP | 406179573 A | * | 6/1994 | B65H/45/14 |

* cited by examiner

*Primary Examiner*—Lanna Mai
*Assistant Examiner*—Paul Royal, Jr.
(74) *Attorney, Agent, or Firm*—Laura C. Hargitt

(57) ABSTRACT

An air bag that includes a fold indicator to indicate whether the air bag has been properly folded within an air bag module. The indicator includes a plurality of marks disposed and spaced on an outer surface of the air bag in a predetermined pattern. The predetermined pattern is arranged such that when the air bag is properly folded the plurality of marks forms a folded pattern indicative of a properly folded air bag. The plurality of marks may be made from a material that is exposable by an x-ray such as a metallic coating. With such a construction, the air bag module, after it as been assembled, may be sent through an x-ray machine and examined as to whether the folded pattern of the marks of the air bag conforms to a standard pattern indicative that the air bag has been folded properly.

4 Claims, 2 Drawing Sheets

AIR BAG FOLD INDICATOR

TECHNICAL FIELD

This invention relates generally to vehicle air bags and more particularly to an air bag having fold indicators which insure that the air bag is folded properly for placement in an air bag module.

BACKGROUND OF THE INVENTION

It is known in the art relating to motor vehicles to provide inflatable air bags to restrain vehicle occupants during a sudden deceleration or collision. Air bags are activated or inflated upon the occurrence of predetermined vehicle conditions. The air bags may be mounted in the instrument panel, seat, door or other locations within vehicle.

Air bags are mounted in air bag modules which include inflators for generating gas to inflate the air bag. To fit within the module, the air bag is folded. The air bag must be properly folded to ensure that the air bag inflates smoothly and rapidly when the inflator of the air bag module is activated. However, a common problem encountered during the manufacture of the air bag module is determining whether the air bag has been folded properly. Therefore, there is a need for a device that indicates whether the air bag has been properly folded.

SUMMARY OF THE INVENTION

The present invention provides an air bag that includes a fold indicator to indicate whether the air bag has been properly folded within the air bag module. The indicator includes a plurality of marks disposed and spaced on an outer surface of the air bag in a predetermined pattern. The predetermined pattern is arranged such that when the air bag is properly folded the plurality of marks forms a folded pattern indicative of a properly folded air bag. The plurality of marks may be made from a material that is exposable by an x-ray. The material may be a metallic coating or paint. With such a construction, the air bag module, after it as been assembled, may be sent through an x-ray machine and examined as to whether the marks in the folded pattern conform to a standard pattern indicative that the air bag has been folded properly.

These and other features and advantages of the invention will be more fully understood from the following description of a certain specific embodiment of the invention taken together with the accompanying drawings.

DESCRIPTION OF THE PREFERRED EMBODIMENT

Figure 1:
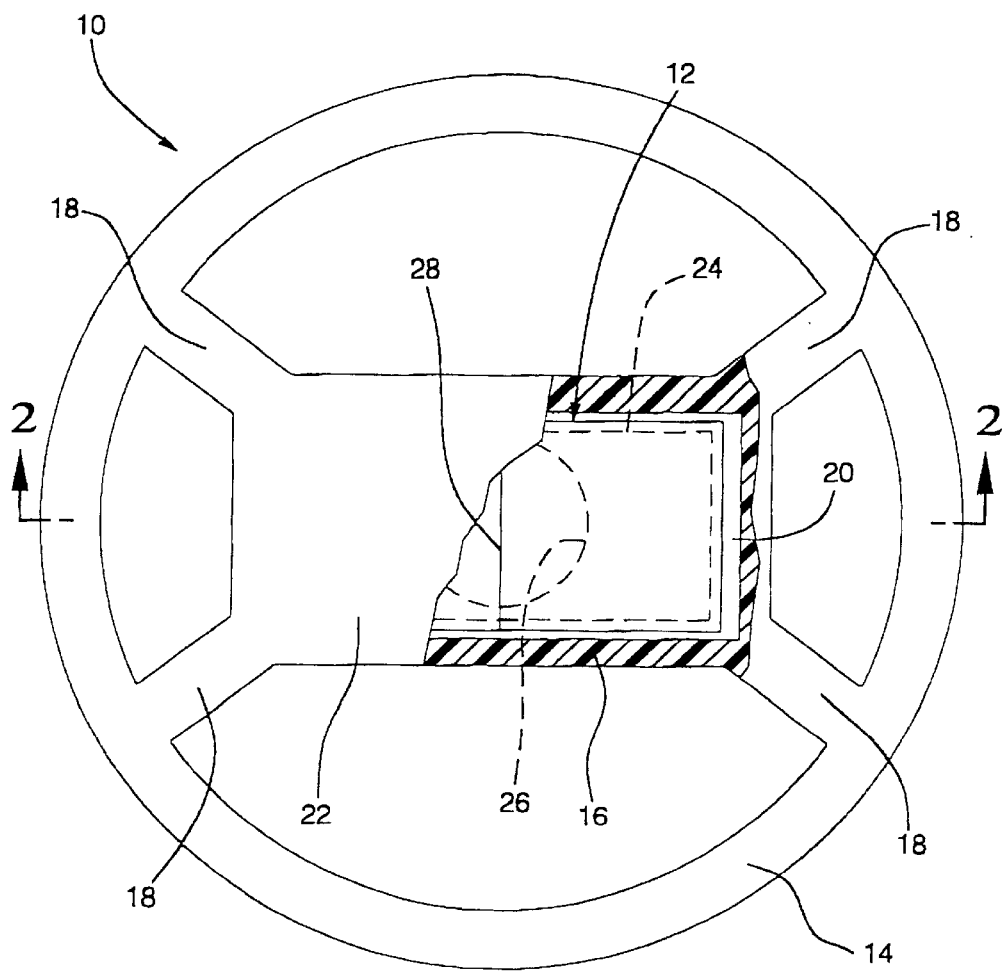
FIG. 1 is a partially cut away top view of a steering wheel assembly that includes an air bag module of the present invention.
Figure 2:
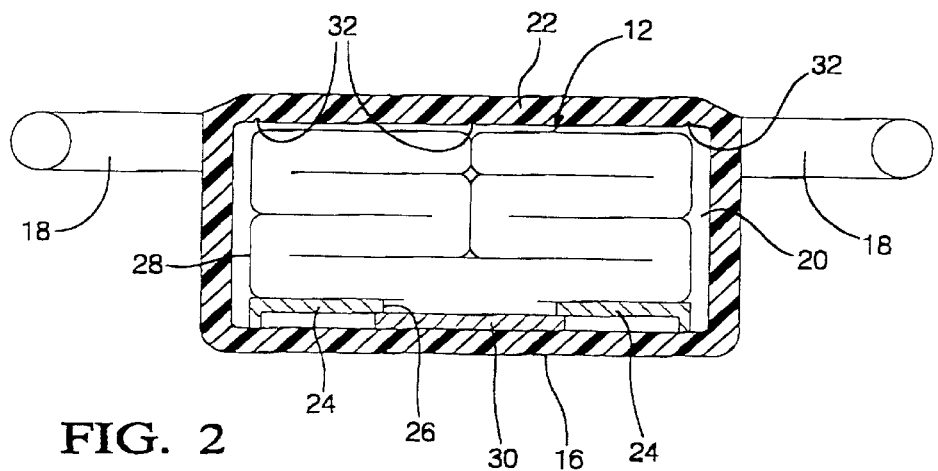
FIG. 2 is an enlarged cross-sectional view taken along line 2—2 of FIG. 1.

Referring now to FIGS. 1 and 2 of the drawings in detail, numeral 10 generally indicates a vehicle steering wheel assembly having an air bag module 12 for restraining a driver during sudden deceleration of the vehicle. The steering wheel assembly 10 includes a circular rim portion 14 connected to a centrally located hub portion 16 via four connecting spokes 18. The hub portion 16 has an air bag module receiving area 20 that serves as a receptacle for the air bag module 12. The air bag module 12 is enclosed within the receiving area 20 by a cover 22 that is contiguously formed as part of the hub portion 16.

The air bag module 12 includes a generally planar base 24 having a centrally located inflator aperture 26. The base 24 is generally rectangular in shape in this particular embodiment being described, but it can be a variety of other shapes. The base 24 generally complements the shape of the receiving area 20. A folded air bag 28 is attached to the base 24 and an inflator 30 is associated with the inflator aperture 26 in a conventional manner. The folded air bag 28 generally complements the rectangular shape of the receiving area 20.

The inflator 30 generally cooperates with the inflator aperture 26 and is situated adjacent the base 24 opposite the air bag 28 such that the inflator 30 is in fluid communication with the interior of the air bag 28. The inflator 30 is mounted to the base 24 in a conventional manner and situated to direct an inflating fluid, such as nitrogen gas, into the air bag 28 to thereby inflate the air bag 28.

Referring specifically to FIG. 2, lines of weakness 32 are formed on the underside of the cover 22 to provide areas of weakness that will yield to open the cover 22 when the inflator 30 is activated. As such, the air bag 28 will penetrate through the cover 22 during deployment to inflate and absorb the force exerted by a forward traveling vehicle occupant.

Figure 3:
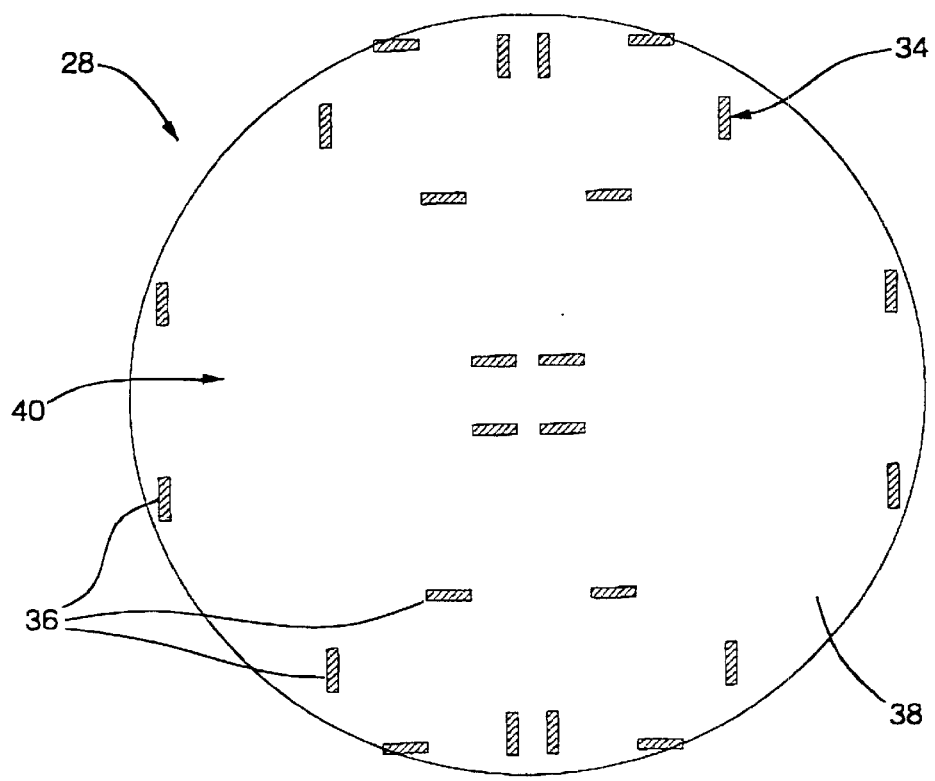
FIG. 3 is top view of an unfolded air bag having marks arranged in a predetermined pattern in accordance with the present invention.
Figure 4:
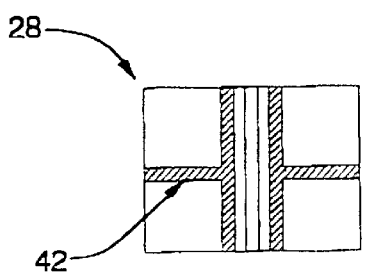
FIG. 4 is a top view of a folded air bag having marks arranged in a folded pattern.

Referring to FIG. 3, when the air bag 28 is not folded, it is of a generally circular shape. However, the air bag 28 may be a variety of different shapes depending on the shape of the base or receiving area for the module. The air bag 28 includes a fold indicator 34 that allows a manufacturer to determine whether the air bag 28 has been properly folded before or after it has been placed within the module 12. The fold indicator 34 includes a plurality of marks 36 disposed and spaced on an outer surface 38 of the air bag 28 in a predetermined pattern 40 shown in FIG. 3. The markings may be formed as strips, dots or any other geometric shape. The predetermined pattern 40 is arranged such that when the air bag 28 is properly folded the plurality of marks 38 forms a folded pattern 42 indicative of a properly folded air bag as shown in FIG. 4.

To easily determine whether the air bag 28 has been folded properly, the markings 38 may be made from a material that is exposable to an x-ray. The material may be a metallic coating or paint. To determine whether the air bag 28 is folded properly, it is passed through an x-ray machine and the folded pattern 42 of the air bag 28 is compared with a standard pattern. If the folded pattern 42 matches the standard pattern, the air bag 28 is folded properly.

While this invention has been described by reference to a preferred embodiment, it should be understood that numerous changes could be made within the spirit scope of the inventive concepts described. Accordingly, it is intended that the invention not be limited to the disclosed embodiment, but that it have the full scope permitted by the language of the following claims.

What is claimed is:

1. A vehicle air bag module comprising:

a base;

a folded air bag mounted to said base and having a folded pattern on an outer surface of said folded air bag for visual comparison to a predetermined pattern indicative of a properly folded air bag wherein said folded pattern is comprised of strips made from a material that is exposable by an x-ray.

2. An air bag module as in claim 1 wherein said material is a metallic coating.

3. An air bag module as in claim 1 wherein said module includes an inflator coupled with the air bag for inflating the air bag.

4. A method of assembling an air bag module with proper bag fold confirmation, the steps comprising:

folding an air bag having marks which form a folded pattern on an outer surface of the folded air bag, the folded pattern exposable by x-ray;

attaching the folded air bag to a generally planar base;

mounting an inflator to the base;

covering the folded air bag, inflator and base with a cover to assemble the air bag module;

x-raying the air bag module; and during the x-raying step, comparing the folded pattern of the folded air bag to a predetermined pattern indicative of a properly folded air bag.

* * * * *